United States Patent [19]

Zietemann

[11] 3,792,291

[45] Feb. 12, 1974

[54] CIRCUIT ARRANGEMENT FOR IMPROVING THE SHORT CIRCUIT RESISTANCE OF THE SLOWER INTERFERENCE-FREE LOGIC CIRCUITS

[75] Inventor: Heinz Zietemann, Munich, Germany

[73] Assignee: Siemens Aktiengesellschaft, Berlin and Munich, Germany

[22] Filed: Sept. 18, 1972

[21] Appl. No.: 290,130

[30] Foreign Application Priority Data

Sept. 28, 1971 Germany .................. P 21 48 437.7

[52] U.S. Cl. ..................... 307/239, 330/19, 330/32, 307/243

[51] Int. Cl. .......................................... H03k 17/00

[58] Field of Search ... 307/236, 237, 238, 239, 243; 330/32, 19

[56] References Cited

UNITED STATES PATENTS

| | | | |
|---|---|---|---|
| 3,185,934 | 5/1965 | Patmore et al. | 330/32 X |
| 3,281,703 | 10/1966 | Biaden | 330/19 X |

FOREIGN PATENTS OR APPLICATIONS

| | | | |
|---|---|---|---|
| 1,762,963 | 12/1970 | Germany | 307/238 |

*Primary Examiner*—John S. Heyman
*Assistant Examiner*—Andrew J. James
*Attorney, Agent, or Firm*—Hill, Sherman, Meroni, Gross & Simpson

[57] ABSTRACT

The emitter-collector paths of two transistors of an amplifier are connected in series by way of a series circuit of two resistors and a diode having the same conductivity direction as that of the transistors. The connecting point of the collector of the first transistor with the diode is located at the base of the second transistor and the connecting point of the diode with the first resistor is located at the output terminal of the amplifier. The connecting point of the two resistors is connected by way of a further resistor to the collector of the third transistor whose emitter is connected to the base of the first transistor and which is controlled at its base to render one of the first transistors conductive while the other is nonconductive. In case of a short circuit at the output of the amplifier and in case of a conductive second transistor, the short circuit current creates, at the resistors between the second transistor and the diode, such a voltage that the Zener voltage of the diode is achieved. The diode becomes conductive in the reverse direction and lowers the voltage at the base of the second transistor. Therefore the second transistor transfers to the unsaturated condition and the current is limited by the second transistor and the serially connected resistors.

6 Claims, 1 Drawing Figure

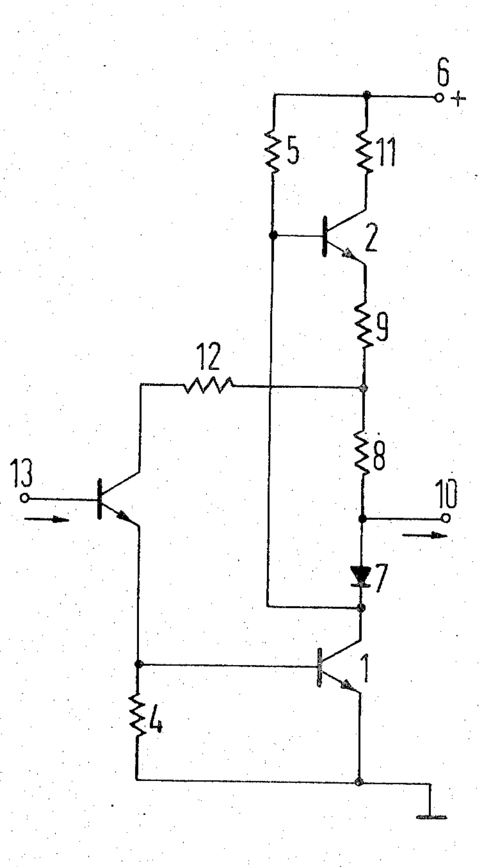
6
+
5
11
2
9
12
8
13
10
7
1
4

CIRCUIT ARRANGEMENT FOR IMPROVING THE SHORT CIRCUIT RESISTANCE OF THE SLOWER INTERFERENCE-FREE LOGIC CIRCUITS

BACKGROUND OF THE INVENTION

1. Field of the Invention

This invention relates to a circuit arrangement for improving the short circuit resistance of circuits which are in the category of the slower interference free logic circuits whose output amplifier consists of two serially connected transistors, one of which is conductive and the other of which is blocked depending on the state of an input signal. The output terminal of the amplifier, which is connected between the two serially connected transistors, is therefore connected in a low ohmic condition with one reference potential provided by one pole of an operational voltage source, or to another reference potential provided by another pole of the operational voltage source. For this purpose, the amplifier output is connected by way of a diode with the collector of a first of the transistors and by way of a resistor with the emitter of the second of the transistors. The collector of the second transistor and the collector of the second transistor is connected by way of a resistor to the other pole of the operational voltage source and the base of the second transistor and the collector of the first transistor are connected by way of a common resistor to the same pole of the operational voltage source. The emitter of the first transistor is directly connected with the reference potential provided by the first-mentioned pole of the operational voltage source and the base of the first transistor is connected to the same potential by way of a resistor along with the emitter of a third transistor. All three transistors are of the same conductivity type and the emitter of the second transistor is connected to the collector of the third transistor. The base of the third transistor serves as an input for receiving control signals for controlling the opposite conductivity states of the first and second transistors.

DESCRIPTION OF THE PRIOR ART

The above circuit arrangement is known in the art and was described, for example, in the German Offenlegungsschrift 1,901,887 and 1,762,963. The gate circuit described in the German Offenlegungsschrift 1,901,887, and which is of the type known as slower interference—free logic (LSL) contains an output circuit amplifier, the circuit arrangement of which forms the basis for the present invention.

The function and the requirements for dimensioning of such an output circuit amplifier are more particularly set forth in the German Offenlegungsschrift 1,762,963. Depending on the control at the base of the above-mentioned first transistor, one of the transistors is blocked and the other is conductive, or vice versa. The control is effected by means of the above-mentioned third transistor which controls the conductivity of the first and second transistors depending on the circuit condition by way of its emitter and collector. The resistance which is located at the emitter of the second transistor is provided as a measure for suppressing interference oscillations at the output. The dimensioning of these resistances thereby depends on the dimensioning of the entire output circuit amplifier and on the capacitive component of the load at the output. The value of resistance thereby does not exceed 150 ohm, as set forth on Page 4 of the German Offenlegungsschrift 1,962,963.

The resistors at the emitter of the second transistor and at the collector of the second transistor both assume the protection of the second transistor in case of a short circuit condition at the output of the amplifier while the second transistor is in a conductive condition. However, for the maximum value of one transistor, the above-mentioned limit and a maximum limit for both transistors taken together is provided by the fact that the static internal resistance of the output amplifier should be as small as possible. The short circuit resistance of the output circuit amplifier is therefore relatively limited.

It has been suggested in the past to increase the value of the ohmic resistance located at the emitter of the second transistor to at least 250 ohm. While it is true that an improvement of the short circuit resistance is achieved, since the amplifier output changes at a certain current from constant voltage operation into a constant current operation, the increase of the value of resistance, however, decreases the voltage for the circuit condition which is available at the output where the second transistor is conductive, and in addition adversely influences for the other circuit condition the control of the first transistor which should be conductive during this circuit condition.

SUMMARY OF THE INVENTION

Our invention is based on the task of increasing the short circuit resistance of the above type of circuit without encountering the above-mentioned disadvantages.

According to the invention, the above objective is achieved for a circuit arrangement of the type described above in that the resistance between the amplifier output and the emitter of the second transistor comprises two resistors which are connected in series and whose connecting point is connected by way of a further resistor with the collector of the third transistor.

Several possibilities derive from this circuit arrangement according to the principles of the present invention. For example, the value of the resistance at the collector of the second transistor, or the resistance at the collector of the third transistor, or the value of these two resistances can be zero. In addition, there is the possiblility that the resistance at the amplifier output is zero, or furthermore that this resistance is zero along with the resistance at the collector of the second transistor.

BRIEF DESCRIPTION OF THE DRAWING

Other objects, features and advantages of the invention, its organization, construction and operation will be best understood from the following detailed description of an exemplary embodiment of a logic circuit in the single FIGURE of the drawing which is a schematic circuit diagram of a logic circuit constructed in accordance with the principles of the present invention in which the short circuit resistance is increased.

DESCRIPTION OF THE PREFERRED EMBODIMENT

The emitter of a transistor 1 of the npn type is connected to a reference potential, here ground potential. The base of the transistor 1 is connected by way of a resistor 4 with the same reference potential. The collector of the transistor 1 is connected by way of a resistor 5 to a positive pole 6 of an operational voltage source. The collector of the transistor 1 is also connected in a series circuit with a diode 7, a resistor 8, a resistor 9 and the emitter of a transistor 2 of the same conductivity type. The connecting point of the diode 7 with the resistor 8 serves as the output terminal 10 of the amplifier.

The collector of the transistor 2 is connected by way of a resistor 11 with the positive pole 6 of the operational voltage source and the base of the transistor 2 is connected in common with the collector of the transistor 1 and by way of the resistor 5 to the positive pole 6. The connecting point of the two resistors 8 and 9 is connected by way of a resistor 12 to the collector of a transistor 3 of the same conductivity type as the transistors 1 and 2. The emitter of the transistor 3 is connected to the base of the transistor 1 and in common therewith by way of the resistor 4 to the reference potential, ground. The base of the transistor 3 serves an an input 13. The diode 7 is poled in the same conductivity direction as the transistors 1 and 2.

Depending on the state of control potential at the input 13 to the transistor 3, even the transistor 1 or the transistor 2 becomes conductive. Therefore, the amplifier output 10 is connected, depending on the circuit condition, in a low resistance manner with either the positive pole 6 of the operational voltage source by way of the transistor 2 or with the reference potential (ground) by way of the transistor 1. If the transistor 2 is conductive, current flows to the output terminal 10 through the resistors 8, 9 and 11 and by way of the emitter-collector path of the transistor 2. If a short circuit occurs at the output terminal 10, the short circuit current will create, by way of the resistors 8 and 9, such a voltage decrease that the blocking voltage or Zener voltage is reached at the diode 7. For an accurate calculation, the base-emitter current of the transistor 2 must be taken into account. When the Zener voltage is exceeded, the diode 10 is rendered conductive in the direction opposite to its normal direction of conduction. Therefore, the potential is decreased at the base of the transistor 2 and the transistor 2 switches from the saturated condition into the unsaturated condition. The resistance of the emitter-collector path of the transistor 2 increases until the voltage decrease at the resistors 8 and 9 has decreased sufficiently to provide the Zener voltage of the diode 7. The constant voltage operaton prevailing up to this point at the output terminal 10 transfers into a constant current operation. The possible power during a short circuit is limited to a value which can be determined by the dimensioning of the resistors 8 and 9. Because of the circuit construction, an additional current path is opened by way of the resistor 5 and the diode 7. The resistor 5, however, has such a high resistance with respect to the aforementioned current path that this additional current may be neglected in the first approximation. Since, therefore, the power consumption which is possible in the case of a short circuit condition can be limited, sufficient protection for the circuit is guaranteed.

However, to prevent this short circuit guarantee from adversely influencing the output power during normal operation, the following criteria must be fulfilled in dimensioning the circuit:

1 The correct control of the transistor 1 by way of the transistor 3 requires a certain amount of resistance by way of the resistors 8 and 12, as is evident to those skilled in the art.

2 In addition to the voltage of the operational voltage source, the resistance of the resistors 8, 9 and 11 when the resistances of the emitter-collector path of the transistor 2 is neglected, is important with respect to the higher voltage level at the output terminal 10 of the amplifier.

3 Short circuit protection is guaranteed by a minimum of the resistors 8 and 9.

In view of these three criteria, the above-described variations of the circuit arrangement according to the invention, and as illustrated in the drawing, are possible. The following calculation is given as an example in which the value of both resistors 11 and 12 are made equal to zero. Furthermore, it should be assumed that the resistor 8 has a value of 100 ohm, that the sum of the value of the resistors 8 and 9 should be as small as possible and that the maximum short-circuit current, without taking into consideration the additional current by way of the resistor 5 and the diode 7, should amount to 20 mA. The resistance of the emitter-collector path of the transistor 2 should be negligible in the saturated condition of the transistor 2. The current limitation, and thus the short circuit prevention, are achieved by transferring the transistor 2 into the unsaturated condition. The current through the resistors 8 and 9 causes such a voltage decrease that by way of the diode 7 the potential at the base of the transistor 2 can be lowered. The current limitation sets in when the Zener voltage of the diode 7 equal the amount of the emitter-base voltage of the transistor 2 and equals the voltage decrease of the resistors 8 and 9. For the smallest value of resistance for the resistors 8 and 9, a value of 300 ohm will result. It has been assumed that the Zener voltage is 6.7 V, the emitter-base voltage at the transistor 2 is approximatley 0.7 V and that the output current is 20 mA. If, for the case of the structure in an integrated circuit, the permissible production tolerances of the resistors (± 25 percent) are taken into consideration, the nominal value for the value of the two resistors 8 and 9 amounts to 400 ohm, which means that the resistor 9 has a value of 300 ohm.

Although I have described my invention by reference to a specific illustrative embodiment thereof many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A logic circuit, comprising: first, second and third transistors of the same conductivity type each having a base, a collector and an emitter, said first and second transistors forming an output amplifier in which one transistor is blocked when the other transistor is conductive, the collector-emitter paths of said first and second transistors connected in series between respective first and second supply potentials, an output terminal connected between the serially connected collector-emitter paths of said first and second transistors and thereby connected in a low resistance manner to the first and second supply potentials by the conducting one of said first and second transistors, a diode connected between said output terminal and said collector of said first transistor and poled in the conducting direction of said first transistor, a first resistor connected between said second supply potential and both said base of said second transistor and said collector of said first transistor, a second resistor connected between said collector of said second transistor and said second supply potential, said emitter of said first transistor connected directly to said first supply potential, a third resistor connected between said first supply potential and both said base of said first transistor and said emitter of said third transistor, said emitter of said second transistor connected to said collector of said third transistor, said base of said third transistor serving as an input terminal for receiving control signals for effecting conducting and blocking of said transistors, and means for improving the short-circuit resistance of the logic circuit including fourth and fifth serially connected resistors connected between said output terminal and said emitter of said second transistor, and a sixth resistor connected between the junction of said fourth and fifth resistors and said collector of said third transistor.

2. A logic circuit, comprising, first, second and third transistors of the same conductivity type each having a base, a collector and an emitter, said first and second transistors forming an output amplifier in which one transistor is blocked when the other transistor is conductive, the collector-emitter paths of sad first and second transistors connected in series between respective first and second supply potentials, an output terminal connected between the serially connected collector-emitter paths of said first and second transistors and thereby connected in a low resistance manner to the first and second supply potentials by the conducting one of said first and second transistors, a diode connected between said output terminal and said collector of said first transistor and poled in the conducting direction of said first transistor, a first resistor connected between said second supply potential and both said base of said second transistor and said collector of said first transistor, said collector of said second transistor connected directly to said second supply potential, said emitter of said first transistor connected directly to said first supply potential, a second resistor connected between said first supply potential and both said base of said first transistor and said emitter of said third transistor, said emitter of said second transistor connected to said collector of said third transistor, said base of said third transistor serving as an input terminal for receiving control signals for effecting conducting and blocking of said transistors, and means for improving the short circuit resistance of said logic circuit including third and fourth serially connected resistors connected between said output terminal and said emitter of said second transistor and a fifth resistor connected between the jucntion of said third and fourth resistors and said collector of said third transistor.

3. A logic circuit, comprising: first, second and third transistors of the same conductivity type each having a base, a collector and an emitter, said first and second transistors forming an output amplifier in which one transistor is blocked when the other transistor is conductive, the collector-emitter paths of said first and second transistors connected in series between respective first and second supply potentials, an output terminal connected between the serially connected collector-emitter paths of said first and second transistors and thereby connected in a low resistance manner to the first and second supply potentials by the conducting one of said first and second transistors, a diode connected between said output terminal and said collector of said first transistor and poled in the conducting direction of said first transistor, a first resistor connected between said second supply potential and both said base of said second transistor and said collector of said first transistor, a second resistor connected between said collector of said second transistor and said second supply potential, said emitter of said first transistor connected directly to said first supply potential, a third resistor connected between said first supply potential and both said base of said first transistor and said emitter of said third transistor, said emitter of said second transistor connected to said collector of said third transistor, said base of said third transistor serving as an input terminal for receiving control signals for effecting conducting and blocking of said transistors, and means for improving the short-circuit resistance of the logic circuit including fourth and fifth serially connected resistors connected between said output terminal and said emitter of said second transistor, and the junction of said fourth and fifth resistors directly connected to said collector of said third transistor.

4. A logic circuit, comprising: first, second and third transistors of the same conductivity type each having a base, a collector and an emitter, said first and second transistors forming an output amplifier in which one transistor is blocked when the other transistor is conductive, the collector-emitter paths of said first and second transistors connected in series between respective first and second supply potentials, an output terminal connected between the serially connected collector-emitter paths of said first and second transistors and thereby connected in a low resistance manner to the first and second supply potentials by the conducting one of said first and second transistors, a diode connected between said output terminal and said collector of said first transistor and poled in the conducting direction of said first transistor, a first resistor connected between said second supply potential and both said base of said second transistor and said collector of said first transistor, a second resistor connected between said collector of said second transistor and said second supply potential, said emitter of said first transistor connected directly to said first supply potential, a third resistor connected between said first supply potential and both said base of said first transistor and said emitter of said third transistor, said emitter of said second transistor connected to said collector of said third transistor, said base of said third transistor serving as an input terminal for receiving control signals for effecting conducting and blocking of said transistors, means for improving the short circuit resistance of the logic circuit including a fourth resistor serially connected between said output terminal and said emitter of said second transistor and a fifth resistor connected between said collector of said third transistor and the junction of said fourth resistor and said output terminal.

5. A logic circuit, comprising: first, second and third transistors of the same conductivity type each having a base, a collector and an emitter, said first and second transistors forming an output amplifier in which one transistor is blocked when the other transistor is conductive, the collector-emitter paths of said first and second transistors connected in sereis between respective first and second supply potentials, an output terminal connected between the serially connected collector-emitter paths of said first and second transistors and thereby connected in a low resistance manner to the first and second supply potentials by the conducting one of said first and second transistors, a diode connected between said output terminal and said collector of said first transistor and poled in the conducting direction of said first transistor, a first resistor connected between said second supply potential and both said base of said second transistor and said collector of said first transistor, said collector of said second transistor connected directly to said second supply potential, said emitter of said first transistor connected directly to said first supply potential, a second resistor connected between said first supply potnetial and both said base of said first transistor and said emitter of said third transistor, said emitter of said second transistor connected to said collector of said second transistor, said base of said third transistor serving as an input terminal for receiving control signals for effecting conducting and blocking of said transistors, and means for improving the short-circuit resistance of the logic circuit including third and fourth serially connected resistors connected between said output terminal and said emitter of said second transistors, and the junction of said third and fourth resistors directly connected to said collector of said third transistor.

6. A logic circuit, comprising, first, second and third transistors of the same conductivity type each having a base, a collector and an emitter, said first and second transistors forming an output amplifier in which one transistor is blocked when the other transistor in conductive, the collector-emitter paths of said first and second transistors connected in series between respective first and second supply potentials, an output terminal connected between the serially connected collector-emitter paths of said first and second transistors and thereby connected in a low resistance manner to the first and second supply potentials by the conducting one of said first and second transistors, a diode connected between said output terminal and said collector of said first transistor and poled in the conducting direction of said first transistor, a first resistor connected between said second supply potential and both said base of said second transistor and said collector of said first transistor, said collector of said second transistor connected directly to said second supply potential, said emitter of said first transistor connected directly to said first supply potential, a second resistor connected between said first supply potential and both said base of said first transistor and said emitter of said third transistor, said emitter of said second transistor connected to said collector of said third transistor, said base of said third transistor serving as an input terminal for receiving control signals for effecting conducting and blocking of said transistors, and means for improving the short circuit resistance of said logic circuit including a third resistor serially connected between said output terminal and said emitter of said second transistor and a fourth resistor connected between said collector of said third resistor and the junction of said third resistor and said output terminal.

* * * * *